United States Patent Office 2,793,976
Patented May 28, 1957

2,793,976

METHOD FOR CONTROLLING HEMORRHAGE IN DEHORNED CATTLE

William W. McKinney, Fort Worth, Tex.

No Drawing. Application August 24, 1953, Serial No. 376,242

3 Claims. (Cl. 167—53.2)

This invention relates broadly to a method of dehorning cattle. More particularly, this invention relates to a method of controlling hemorrhage in cattle following surgical dehorning and to a hemorrhage controlling composition therefore.

It is the general practice to remove the horns of calves, usually while they are yearlings. This is done for a variety of reasons, among them being safety in shipping, to avoid the likelihood of cattle being shipped together in trucks or railroad cars from becoming caught between slats of the truck or car. From the cattle feeders' standpoint, dehorning allows more cattle to eat from the same feed trough since cattle do not have to fear attack by the sharp horns of the cattle beside them. At the same time the possibility of the cattle goring and injuring one another or of injuring workmen is greatly diminished. When cattle are dehorned, they are deprived of a formidable weapon. This reduces the fighting in the pasture as well as in the feed lot, and when such fights do occur, they are not so injurious to man or other cattle.

The horns are formed of an inner bony core covered by a thick heavy epidermal keratinous sheath. The bone includes a central sinus surrounded by an outer layer having a mesh-like surface.

When a horn is cut off the exposed portion of the cut surface discharges liquid matter, including blood. The bleeding occurs principally from the mesh-like surface between the inner sinus and the outer horny layer. If not controlled, the hemorrhage following surgical dehorning results in loss of weight in the affected cattle and in some cases leads to death. In addition to the high shrinkage and mortality rates directly attributable to hemorrhage, the cattle are subject to attack on the exposed horn stump to insect infestation and disease, further contributing to loss of weight, condemnation as unfit for market for human consumption and considerable loss by death. Although attempts have been made to obviate the use of surgical dehorning by employing escharotic materials which, if applied to a young calf, stunt horn growth, these attempts have not been successful. The highly caustic substances required to inhibit growth of the horn are difficult to confine on the horn surface and therefore attack other tissues, in some cases running into the eyes of the animals and blinding the calves. The principal objection to the escharotics is that the highly caustic material comes in contact with the udder and flank of the calf's mother. When this occurs large chunks of flesh fall out of the area the caustic has touched. The use of escharotics has, therefore, not been practical and has not come into wide acceptance.

It is the principal object of this invention to provide a method of surgical dehorning of cattle which is effective to substantially reduce shrinkage, condemnation, and mortality attributable to dehorning.

It is another object of this invention to provide a method of controlling hemorrhage in surgically dehorned cattle in order to reduce substantially the weight loss and high mortality rate due to hemorrhage.

Another object of this invention is to provide a composition for application to the exposed cut surface of a horn stump to control the bleeding thereof.

A further object of this invention is to provide a method of surgically dehorning cattle which includes the step of controlling bleeding resulting therefrom by the application of a hemorrhage controlling composition to the exposed portion of the cut surface of the horn.

A still further object of this invention is to provide the cattleman a practical product for control of hemorrhage from the horn stump of dehorned cattle for use in established dehorning procedures and under normal range conditions.

It is still another object of this invention to provide a non-caustic composition for control of hemorrhage in dehorned cattle which is safe and harmless both to cattle and humans.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated this invention comprises a method of dehorning cattle wherein the horns of the cattle are removed surgically by cutting as near to the scalp of the cows or calves as possible (employing conventional dehorning instruments, of which there are many types commercially available on the market), and thereafter controlling bleeding from the exposed portion of the cut surface of the bone by the application thereto of a hemorrhage controlling composition comprising a wax, an oil and a phenolic antiseptic compound. It has beeen found that this method has been effective in substantially reducing both the shrinkage normally encountered in animals after dehorning and the mortality rate due to hemorrhaging of the animals.

The hemorrhage controlling composition is composed of a wax to give body to the composition as applied to the exposed portion of the cut surface and enable it to remain in place until normal clotting of the blood has occurred, an oil to act as a softener or plasticizer for the wax and a phenolic compound as an antiseptic. The wax should ordinarily be present in an amount ranging from about 60 to 80 percent by weight of the total composition and preferably between about 65 and 75 percent by weight. While beeswax is a preferred material, other relatively low melting point insect, animal, vegetable, mineral and synthetic wax and wax-like substances having properties similar to beeswax may be employed. These include, for example, such naturally occurring substances as paraffin waxes having melting points in the range of about 125 to 155° F., petrolatums, spermaceti, Japan wax, tallow and the like and such synthetic wax-like materials as polyethylene glycols available under the trademark "Carbowax."

The oil should be present in the hemorrhage controlling composition in an amount from about 10 to 30 percent by weight depending upon the particular wax employed. Sufficient oil is used to impart a soft pliable putty-like consistency to the finished composition. Normally, from about 15 to 25 percent by weight of oil is necessary to produce a material of the desired consistency. While a light grade of petroleum hydrocarbon mineral oil is preferred for use in this composition, other oils of animal or vegetable origin having similar properties may be employed instead. Exemplary oils include, for example, cottonseed oil, peanut oil, corn oil, lard oil, soybean oil, whale oil and the like.

The antiseptic phenolic compound is present in the composition in amounts ranging from about 3 to 15 percent by weight and preferably in an amount from about 7 to 12 percent by weight. Phenol itself is the preferred phenolic compound for use in this dehorning composition, but other phenolic compounds and derivatives having like antiseptic properties may also be used. Representative antiseptic phenolic compounds include, in addition to phenol, o-, m- and p-cresol, creosote, thymol, resorcinol, hexylresorcinol, pyrocatechol, pyrogallol and the like.

The hemorrhage controlling composition is prepared by intimately admixing the ingredients to form a substantially homogeneous mixture or mass. Although any suitable vessel in which the wax may be melted may be employed a steam jacketed kettle is most conveniently used. The kettle is also preferably equipped with mechanical agitating means. Preferably, the wax, or the wax and oil, are charged to the vessel and heated gently until the wax is melted. The mixture is then stirred to thoroughly and intimately admix the wax and oil and then the antiseptic is added. Stirring is continued to effect a thorough blend and uniform distribution of the antiseptic throughout the composition. The composition upon cooling to normal room temperature should have a waxy, non-tacky feel and should be relatively soft and pliable with a paste-like or putty-like consistency. It is preferably run into suitable containers, such as cans or jars, or shipment and sale, directly from the mixing vat while still in a liquid state.

One specific preferred composition for use in controlling hemorrhage in cattle after dehorning consists of a substantially homogeneous blend of seven parts by weight of beeswax, two parts by weight of oil and one part by weight of phenol. While these are preferred proportions, the invention is by no means limited to these specific amounts, but, on the contrary the mixture may include from six to eight parts of beeswax, from one to three parts of oil and from one-third to one and one-half parts of phenol. Likewise, the composition may be varied within these proportions by substituting any of the equivalent materials recited above.

In use, after each horn has been surgically severed from the head of the cow or calf, a small pellet or chunk of the waxy bleeding controlling composition is pressed in place over the exposed cut surface. For a yearling calf the piece of waxy composition of the required size would be of about the size of a large pea, that is, a pellet of from about 3/8 to 1/2 inch in diameter. It is preferably worked momentarily between the fingers before application to the horn stump to soften it and make it easier to apply. The sinus that is in the middle of the horn need not be plugged since little or no bleeding occurs there. However, the composition is pressed down the mesh-like surface around the sinus from which considerable bleeding occurs. The composition effectively plugs the openings in this mesh-like surface and becomes anchored in place on the cut surface of the horn. Because it remains in place, not becoming dislodged by the pressure of the outward flow of blood, the surface layer of wax serves to stop the flow of blood almost immediately after severing of the horn and the natural blood clotting processes of the animal are permitted to become operative at once so that any tendency to hemorrhage is controlled before serious hemorrhaging can begin. While being effective in controlling hemorrhage, the composition of this invention in place on the cut surface of a horn does not cause abscesses nor does it interfere with natural drainage or healing in any way. It may be readily applied by an inexperienced operator and its application does not necessitate any change in the normal procedures employed by the cattleman.

In a field test of the hemorrhage controlling product and procedure of this invention under normal field operating conditions the commercial practicality of the invention was established. The field test was carried out on 800 head of 10 to 12 month old calves using conventional surgical dehorning procedures and techniques. The bleeding controlling composition of this invention was applied in the manner described above to 400 head of calves. The other 400 head received no treatment and were used as a control. It was found that bleeding among the treated calves was notably decreased by the use of the hemorrhage controlling material with the result that the shrinkage of these animals was appreciably lessened. After two months' time a considerable weight differential existed between the treated and untreated calves. In a time study of the test it was determined that a time differential of less than thirty seconds per calf existed between the animals dehorned in the conventional manner without further treatment and those dehorned in the conventional manner and then treated with the composition of this invention.

Although this invention has been described with particular reference to cattle, it will be readily apparent that it is equally adaptable to the treatment of other horned animals, such as, for example, sheep, goats and the like.

As many apparently widely different embodiments of this invention may be made without departing from the spirit and scope thereof, it is to be understood that I do not limit myself to the specific embodiments herein.

What I claim is:

1. In the process of dehorning animals by which the horns are surgically severed leaving an exposed cut surface adjacent the skull of the animals the improvement which consists in pressing down into the exposed mesh-like surface of the horn stump a soft pliable hemorrhage controlling composition consisting essentially of a substantially homogeneous admixture of from about 60 to 80 percent of a wax, 15 to 25 percent of an oil and 3 to 15 percent of a phenolic antiseptic compound.

2. In the process of dehorning cattle by which the horns are surgically severed leaving an exposed cut surface adjacent the skull of the animals the improvement which consists in pressing down into the exposed mesh-like surface of the horn stump a soft pliable hemorrhage controlling composition consisting essentially of a substantially homogeneous admixture of from about 6 to 8 parts by weight of beeswax, 1 to 3 parts by weight of oil and 1/3 to 1 1/2 parts by weight of phenol.

3. In the process of dehorning cattle by which the horns are surgically severed leaving an exposed cut surface adjajcent the skull of the animals the improvement which consists in pressing down into the exposed mesh-like surface of the horn stump a soft pliable hemorrhage controlling composition consisting essentially of a substantially homogeneous admixture of from about 7 parts beeswax, 2 parts oil and 1 part phenol.

References Cited in the file of this patent
UNITED STATES PATENTS 2,369,219    Doyle _____ Feb. 13, 1945

OTHER REFERENCES

Pharmaceutical Formulas, vol. 1, 11th ed., 1944, The Chemist and Druggist, London, pages 660, 661 and 1026.

Milks: Practical Veterinary Pharmacology, Materia Medica and Therapeutics, sixth ed., 1949, Alex Eger, Chicago, Ill., page 564.